Oct. 25, 1949.  N. FELICI  2,486,140

ELECTROSTATIC GENERATING AND DRIVING MACHINE

Filed Feb. 11, 1946  2 Sheets-Sheet 1

Patented Oct. 25, 1949

2,486,140

UNITED STATES PATENT OFFICE 2,486,140

ELECTROSTATIC GENERATING AND DRIVING MACHINE

Noël Felici, Grenoble (Isere), France, assignor to Centre National De La Recherche Scientifique, Paris, France, a public establishment of France Application February 11, 1946, Serial No. 646,737
In France November 8, 1944

Section 1, Public Law 690, August 8, 1946
Patent expires November 8, 1964

18 Claims. (Cl. 171—329)

This invention relates to electrostatic machines and more especially to such machines of the type having conductive electrodes for accumulating and for carrying and transferring the electrostatically produced energy to or from a terminal of the machine.

It is well known that the working conditions of electrostatic generating machines and of electrostatic motors depend considerably on the fluid dielectric medium in which they operate and that these conditions are improved when the dielectric strength of said medium is increased.

For this purpose it is known to use gases having a high dielectric strength such as chlorinated or fluorinated compounds or ordinary air under pressure.

In the course of studies made in accordance with the invention with a view to improving the presently existing electrostatic machines, experiments have been made for determining the increase of power which it is theoretically possible to obtain by substituting for the fluid dielectric medium having a dielectric constant $\epsilon$ and a dielectric strength E surrounding an electrostatic machine another fluid medium having a dielectric constant $\epsilon'$ and a dielectric strength $E'_m$ different from those of the first dielectric medium.

It is known that the field intensity on the surface of a conducting electrified body or electrode determines the value of the "electric pressure" and that the forces which act on the surfaces of electrified conducting bodies are always perpendicular to the surface so that one may speak of an "electric pressure" which is the electric force acting on a unit surface. The theory of the electrostatic field has shown that the electric pressure may be expressed as $$\frac{\epsilon E^2}{8\pi}$$

This formula gives the electric pressure in dynes per square centimeter when $\epsilon$ is the dielectric constant of the fluid medium and E is the field intensity, these values being taken in electrostatic units.

It has been found in accordance with the present invention that if the power of an electrostatic machine were limited only by the dielectric strength of the fluid medium in which it operates, the substitution of a medium with a dielectric constant $\epsilon$ and a dielectric strength $E_m$ by a medium with a dielectric constant $\epsilon'$ and a dielectric strength $E'_m$ would result in multiplying the maximum attainable power of said machine by ratio $$\epsilon' E'^2_m / \epsilon E^2_m$$

that is to say by ratio $$\frac{\epsilon' E'^2_m}{8\pi} \Big/ \frac{\epsilon E^2_m}{8\pi}$$

between the maximum electrostatic pressures in the two media. In these formulae also the units to be used are those of the mechanical C. G. S. and of the electrostatic C. G. S. systems. The same is true for all the formulae mentioned in the present specification when no other indication is given.

The preceding result is explained through considering that the maximum charge of the conveying members or electrodes of an electrostatic machine is proportional to the maximum electric induction $\epsilon E_m$ which can exist in the medium. The same is true, for a constant speed, of the maximum current conveyed by these members while the maximum potential of the collecting members or the terminal is proportional to $E_m$. The maximum power, i. e., the product of the maximum current by the maximum potential is thus proportional to $\epsilon E^2_m$, i. e., to the maximum electrostatic pressure $$\frac{\epsilon E^2_m}{8\pi}$$

However, it has not been possible heretofore, when placing an electrostatic machine with movable conductive members such as a Wimshurst or a Toepler machine in a medium having a very high dielectric strength, to obtain from such a machine a maximum power equal to the product of the power developed when working in air at atmospheric pressure by the ratio of the maximum electrostatic pressures of the medium and of air at atmospheric pressure.

Electrostatic machines as heretofore constructed having conducting members or electrodes are unable to produce large amounts of power output when operating in atmospheric air because the forces acting on their movable members are very limited. It is known that increase of the pressure of the air improves the output of conventional electrostatic machines but results which up to the present have been obtained in such machines have been unsatisfactory. The power output of such machines may be multiplied by 3 to 5 when operating in air at 5 to 10 atmospheres but the power in atmospheric air is so small that such an increase is not sufficient to give any practical result. Nevertheless, from the theoretical viewpoint the increase of power output which should be secured by the use of compressed air or other compressed gases of high dielectric strength is very much greater than actually has been secured and the maximum power output should be proportional to the square of the dielectric strength of the medium in which the machine operates.

The present invention precisely provides a method which makes it possible to determine the chief features of an electrostatic generating machine or an electrostatic motor with relatively movable conductive members for the purpose of obtaining with such a machine operating in a medium having a very high dielectric strength specific power, that is, the power per unit volume or weight or both, considerably higher than that which has been obtained heretofore and which in practice may be 100 or 200 times that which would be obtained with the same machine working in air at atmospheric pressure.

It is known that, in any electrostatic machine with relatively movable conductive members, electric energy is set in action by means of the variable capacities produced in the relatively moving electrodes, that is, the fixed and movable conductive members or by two different sets of oppositely movable conductive members. The dimensions of spacing and area of the relatively movable members which determine the value of these capacities, together with the potential difference which is impressed thereon and which is limited by the dielectric strength of the fluid medium in which the machine operates, determine the quantity of electricity with which these members can be charged and which the conveying members transmit while being discharged to the brushes and terminals. The intensity of the current is proportional to this quantity of electricity and to the number of charges and discharges of the conveying members per second, that is to say, the current is proportional more particularly to the relative speed of these conveying members with respect to the producing members. The power output is equal to the product of the potential of the terminal by the intensity of the current.

In the course of the above mentioned study relating more particularly to machines having conductive members or electrodes movable with respect to each other it has been found in accordance with the invention that an essential aspect of the process of converting mechanical work into electric energy—or conversely—had been hitherto neglected. For simplicity the following explanation will be given in connection with the movable conductive members of the machine but the principles and features developed apply equally to the stationary conductive members.

It is known that the electric energy produced by an electrostatic machine operating as a generating machine is due to the conversion of mechanical work which is necessary to overcome the resisting electrostatic forces acting on the movable members. Conversely, when the machine operates as a motor the mechanical work supplied by the machine is due to the same electrostatic forces.

The regions of the movable members where these forces are acting will be called in the following discussion the "active parts" of the machine by extension of the language used for the electromagnetic machines in which the conductors on which the electromagnetic forces act are called "active conductors." If $E_m$ is the dielectric strength of the dielectric medium in contact with the active parts of the machine and if $\epsilon$ is the dielectric constant of said medium the highest value which the electrostatic pressure on said parts can reach without any breakdown of the dielectric is equal to $$\frac{\epsilon E_m^2}{8\pi}$$

as above stated.

An important condition which has been discovered in connection with this invention is that if the conductive members or electrodes in an electrostatic machine are provided with smooth surfaces continuous over the whole active surface thereof, which may be accomplished with parallel plates having edges of a proper form, the dielectric strength of the air rises nearly proportional to the pressure of the air. Conventional machines, however, have failed to provide throughout the whole extent of the electrode such continuous smooth surfaces as are required to obtain the increase of dielectric strength approximately proportional to the pressure which will make possible an increase of power proportional to the square of the dielectric strength. It is possible, for example, to obtain in air compressed to about 30 atmospheres field intensities of 600 kv. per centimeter, that is to say, 20 times as great as the maximum field intensity of about 30 kv. in atmospheric air. It would be expected, therefore, that the maximum power output from electrostatic machines should be multiplied by $20^2=400$ when working in compressed air at 30 atmospheres. Such a result, however, has not been reached in the operation of conventional machines in which it has been possible only to multiply the power by 3 to 5 even when working in air at very high pressure.

One reason for such failure to increase the power output with increase of pressure of the air used as the dielectric medium is that all conventional machines having conductive members or electrodes have been built with thin foils or plates which do not provide smooth continuous surfaces throughout the active extent thereof so as to be capable of taking advantage of the increase in the dielectric strength proportional to the increase in the pressure of the air, the edge surface of the foil being so limited that the requisite smoothness and continuity thereof with the face surface of the foil are not attainable. The second reason is that such thin foils are not capable of providing sufficient edge surface to provide for substantial forces acting in the direction of movement of the movable electrode, this direction ordinarily being parallel to the face surface of the foils. Since the electric forces acting on the flat face surface of the electrodes are perpendicular to the surface, the flat face surfaces of such foils are effective only for providing electrostatic capacities and stored electrostatic energy. The forces which may produce the work corresponding to the release of this stored energy during the movement of the movable member or electrode in relation to the stationary electrode are the forces acting on the edge of the foil but the surface of such an edge is so small that the amount of force acting on it is negligible.

For determining the principal features of the active parts of an improved electrostatic machine capable of producing high specific power, the maximum work may be calculated which can be developed by the electrostatic forces acting upon the movable conductive member or electrode.

It is necessary here to distinguish various different cases in which

I. The movable conductive members are in contact only with a fluid dielectric medium;

II. These members are in contact not only with such a fluid medium but also with a solid insulating part;

III. These members are in contact with a solid insulating part throughout the extent of their active surface.

For the above mentioned calculation of maximum work in case I of the movable conductive member or electrode in contact with a fluid dielectric medium, the profile or contour of the forward and rear edges of this member are respectively projected on a plane which is perpendicular to the direction of movement. In the following discussion, and by analogy to hydrodynamics, the area produced by the product of this projection multiplied by the length of the edge of the movable member transversely of the profile plane is called the "main frame area" of such movable conductive member.

It will be understood that the maximum work which it is the purpose to develop is equal to that which a single force, the intensity of which is equal to the product of the main frame area of the movable conductive member multiplied by the maximum electrostatic pressure $$\frac{\epsilon E_m^2}{8\pi}$$

exerts on the active parts of this member, the application point of this single force being the centre of gravity of main frame area with the movable member.

In the above considered case II where the movable conductive members are in contact both with a fluid dielectric medium and with a solid insulating part it is necessary to take into account not only the electrostatic pressure forces exerted directly on said members but also the forces exerted on the insulating parts fastened to the movable conductive members when these insulating parts supply effective mechanical work.

These forces are due to two causes:

1. The polarization of the insulating parts which causes polarization charges to appear thereon;

2. The ordinary electrification of the insulating parts by friction, fixing of ions or other cause. In practice the second type of electrification is negligible in the machines of the invention.

Most of the insulators are sufficiently near the perfect dielectric state to make it possible in practice, as it is well known, to substitute the system of the polarization forces acting upon the same by an equivalent system of pressures normal to their surface and of a value $$\frac{\epsilon'-\epsilon}{8\pi}E^2\left[1-\frac{\epsilon'-\epsilon}{\epsilon'}\cos^2\alpha\right]$$

where $\epsilon'$ designates the dielectric constant of the solid, E the field intensity in the fluid in the neighborhood of the solid and $\alpha$ the angle of this field with the normal to the surface of the solid. The pressure is directed toward the outside of the solid in the case, which is very frequent in practice, when $\epsilon' > \epsilon$.

When the solid insulator is in contact with an electrified conductor the total pressure exerted upon its surface becomes $$\frac{(\epsilon'-\epsilon)\epsilon}{8\pi\epsilon'}E^2$$

since $\alpha=0$ for the contacting surface of the conductor. This pressure is added to the electrostatic pressure $$\frac{\epsilon E^2}{8\pi}$$

acting upon the conductor itself for giving the resultant or total electrostatic pressure $$\frac{\epsilon' E'^2}{8\pi}$$

where $\epsilon'$ is the dielectric constant of the solid insulator and $E'$ the field intensity in this insulator in the neighborhood of the conductor, $E'$ being equal to $$\frac{\epsilon E}{\epsilon'}$$

Thus, the electrostatic forces acting upon the active parts of the machine result:

(A) From the electrostatic pressures $$\frac{\epsilon E^2}{8\pi}$$

applied to the parts of the surface of the movable conductive members which are in contact with the fluid medium;

(B) From the electrostatic pressures $$\frac{\epsilon' E''^2}{8\pi}$$

applied to the parts of the surface of the movable conductive members which are in contact with the solid insulator;

(C) From the pressures $$\frac{\epsilon'-\epsilon}{8\pi}E^2\left[1-\frac{\epsilon'-\epsilon}{\epsilon'}\cos^2\alpha\right]$$

applied to the parts of the surface of the solid insulator which are in contact with the fluid medium.

The two cases are still here to be distinguished:

1. The solid insulator is in contact with only one movable conductive member.

2. The solid insulator is in contact with two or more movable conductive members. This case occurs, for instance, in the Wommelsdorf machines where all the movable conductive members are embedded in the same insulating disc.

In the first case (1) three main frame areas may be considered which are obtained by projecting respectively under the above mentioned conditions the surface of separation between the movable conductive member proper and the fluid dielectric medium, the surface of separation between said member and the solid insulator and the surface of separation between the solid insulator and the fluid dielectric medium. These three projected surfaces are designated in the following explanation respectively as (a) Main frame area of a conducting member covered by the fluid medium, (b) Main frame area of a conducting member covered by the solid insulator, and (c) Main frame area of the solid insulator.

In this case the maximum work which it is the purpose to develop is equal to that of a single force obtained by the algebraic sum of three forces the intensities of which are respectively equal to the products of the electrostatic pressures defined in the above paragraphs (A), (B) and (C) by the corresponding main frame areas. The single force in question is applied at a point of the projection plane moving with the movable conducting member.

In the second case (2) the solid insulating part in contact with two different movable conducting members may be divided in two by an imaginary plane perpendicular to the direction of movement. This plane separates the solid insulating part into portions each of which may be considered as moving with a single movable conducting member. The main frame area of such an insulating portion which corresponds to the cross section of this portion in the imaginary plane need not be taken into account when calculating the useful forces because the forces acting on both faces of the plane are equal and opposite according to the principle of action and reaction.

The problem of dealing with the solid insulating parts in contact with the conductive members may be reduced, therefore, to the first case (1), the definitions of the main frame areas remaining the same.

In most types of electrostatic machines as heretofore constructed the movable conductive members are formed of thin metallic foils the main frame area of which is very small owing to this thinness. The maximum force which can act upon such a member is very limited and cannot produce any substantial amount of mechanical power. The electric power is limited in the same manner.

In the investigations which have led to the present invention it has been found that to obtain a sufficient value of useful electrostatic force acting between the movable electrodes carried by the movable member of the machine and the stationary electrodes of the machine in the direction of movement of the movable electrodes it is necessary to form the electrodes with sufficient thickness to provide the requisite main frame area and to shape the edges thereof so as to insure substantially uniform distribution of the field intensity over the whole exposed surface of the electrodes, thereby to avoid field concentrations such as may occur at the edge of a foil which may produce corona and sparking and may prevent the attainment of the available improvement for utilizing the dielectric strength nearly proportional to the pressure of the dielectric gaseous medium such as air. It has been found further that it is necessary to provide a certain minimum thickness of the electrode or conductive member which is in a predetermined relation to the spacing of the movable and stationary electrodes or conductive members in order to secure maximum power.

As above indicated it is important to shape the edge surfaces of both the movable and stationary electrodes so as to avoid field concentration and to insure a uniform distribution of the field over the whole active surface of the respective electrodes. When an electrode having the requisite minimum thickness in relation to the spacing is used it is always possible to obtain a field intensity on the edge surfaces thereof which is not substantially greater than the field intensity of the faces of the electrodes which are in parallel relation to each other and this field may approach the maximum safe value permissible in a dielectric medium of a given dielectric strength in contact with the active surfaces of the conductive members. In general the outline of the profile of the surfaces of each electrode in a plane which is perpendicular to the parallel face surfaces of these electrodes and which extends in the direction of movement of the movable electrode is that of a smooth curve tangent to the respective faces of the electrode and convex with respect to the electrode.

It has been shown in the preceding discussion that in the case when the movable members are in contact only with a fluid dielectric medium the maximum work which the electrostatic forces acting upon such a member can develop is that due to the force F which is equal to $$\frac{\epsilon E_a^2 S}{8\pi}$$

applied at the center of gravity of the main frame area S. In order to obtain the maximum available power of the machine which may be developed from the value of the capacities formed by the movable and stationary conductive members and from the difference of potential which may be impressed on them, as stated above, it is necessary that the force F shall have at least a minimum value. This value may be calculated when taking into account the general fact that the work of this electrostatic force corresponds to that which is produced by the variation of the electrostatic energy stored in the capacities formed by the stationary and movable members. Accordingly the main frame area S which the member under consideration must possess is equal at least to $$\frac{8\pi F}{\epsilon E_a^2}$$

This first result having been obtained it is necessary to provide for as uniform distribution of the electrostatic field as possible in the neighborhood of the active parts of the movable members by giving said parts suitable shapes which may be determined, for instance by calculation or by graphic methods.

The requisite shape is that provided by a profile section having a smooth curve convex in the conductive member, the curvature of which at the point where it intersects the normal thereto which is parallel to the direction of movement of the movable member or electrode is not less than the curvature at the point of tangency of the curve with the face of the electrode. Where in an electrostatic machine an electrode, either movable or stationary, is arranged between cooperating electrodes to provide active surfaces at each face which are parallel to the direction of movement of the movable electrodes, this smooth curve is tangent to both of the parallel faces of the electrode and in the ordinary case its maximum curvature occurs at the median line between these parallel faces of the electrode. The curve is of such form that the distance from the normal to the parallel surfaces of this electrode which is located at the points of tangency measured to the point of maximum curvature along the median line is greater than the thickness of the electrode between its parallel faces and may be of the degree of 1.5 times this thickness. In a machine in which the movable electrode provides only one active surface in relation to the active surface of the stationary electrode the edge surface of the electrodes is formed with substantially the same curvature with respect to the single active face thereof, that is, the essential curvature is that provided by the curve from one of the points of tangency at one side of the median line in the electrode having two active faces to the point of maximum curvature. The edge surface in the single face electrode, however, is continued in rounded form beyond this point to prevent leakage or sparking.

The underlying reason for this requirement as to the form of the curve may be shown to be that the effect of the increase of the distance of the surface of one electrode from the cooperating electrode at successive points along the curved edge surface in combination with the tendency of the increasing curvature of the electrode to produce concentration of the field toward the point of maximum curvature balance each other to secure uniform distribution. A good approximation of the optimum shape of the profile of the section of the electrode is that of half an ellipse the ratio of the axes of which is between 2 and 3 to 1, the short axis of the ellipse extending perpendicular to the face surface of the electrode. It is not possible in all cases to obtain an absolutely uniform distribution of the electric field around the active parts of the conductive movable members. If the electric field in the vicinity of the movable conductive member reaches the dielectric strength $E_m$ of the medium at some point without exceeding this dielectric strength, the intensity of the useful force acting on the movable conductive members is $$\frac{K \epsilon E_m^2 S}{8\pi}$$

S being the main frame area under consideration and K a coefficient less than 1 which characterizes the degree of utilization of the main frame area and which is designated in the following discussion by the expression "shape index." K in some cases may reach its maximum value 1 when it is possible to obtain the desired absolutely uniform distribution of the electric field, but K in general has a value slightly less than 1, making it necessary to provide a main frame area a little greater than the maximum value given by formula $$\frac{8\pi F}{\epsilon E_m^2}$$

In the case when the movable conductive members are in contact not only with the fluid dielectric medium but also with a solid insulator it is necessary to take into account three main frame areas corresponding to the three pressure classes defined in the above paragraphs (A), (B) and (C).

If S is the main frame area of a movable conductive member covered with the fluid medium, S' the main frame area of the same member covered by the solid insulator, S'' the main frame area of the solid insulator moving with said movable conductive member, the maximum work of the pressure (A) applied to the movable conductive member is approximately equal to that of a single force applied at the center of gravity G of the surface S, said point being considered as moving with the movable conductive member and its intensity being $$\frac{\epsilon E_m^2 S}{8\pi}$$

$\epsilon$ being the dielectric constant and $E_m$ being the dielectric strength of the fluid medium. The maximum work of the pressure (B) is approximately equal to that of a similar force applied at the center of gravity G' of the surface S' and the intensity of which is $$\frac{\epsilon' E_m'^2}{8\pi} S'$$

$\epsilon'$ and $E'_m$ respectively being the dielectric constant and dielectric strength of the solid insulator. The maximum work of the pressure (C) is approximately equal to that of a force applied at the center of gravity G'' of the surface S'' and the intensity of which is $$\frac{(\epsilon'-\epsilon)\epsilon}{8\pi\epsilon'} E_m^2 S''$$

since the angle $\alpha$ is generally small because the ratio $$\frac{\epsilon'}{\epsilon}$$

has a high value in most cases.

The three forces (A), (B), (C) are parallel and may be added algebraically in calculating the maximum total work done by the movable members. The total maximum force, therefore, may be expressed as $$\frac{\epsilon E_m^2}{8\pi} S + \frac{\epsilon' E_m'^2}{8\pi} S' + \frac{(\epsilon'-\epsilon)\epsilon}{8\pi\epsilon'} E_m^2 S''$$

In order to obtain the maximum available power of the machine it is necessary that this force shall have at least a certain intensity F which may be calculated as above stated. Accordingly, the three main frame areas S, S' and S'' should satisfy the relation that the sum of the three forces should not be less than F.

This result being obtained, it is necessary, as indicated above, to provide as uniform distribution of field intensity as possible by giving to the active parts suitable shapes which may be determined as hereinafter discussed. If the distribution of the field intensity is not exactly uniform, shape indices K, K', K'' must be introduced into the above formula which they become.

$$K\frac{\epsilon E_m^2}{8\pi} S + K'\frac{\epsilon' E_m'^2}{8\pi} S' + K''\frac{(\epsilon'-\epsilon)\epsilon}{8\pi\epsilon'} E_m^2 S'' \geq F$$

This formula becomes greatly simplified if the solid insulator is provided with plane faces parallel to the movement of the movable member. In this case there are no active surfaces of the insulator effective in the direction of movement and S'' then becomes zero, thus eliminating the third term from the formula. If, furthermore, the active parts of the movable conductive members are completely surrounded by the solid insulator as in the Wommelsdorf machine, the surfaces S are also eliminated. The first term of the formula then is eliminated and the minimum value of the surface S' is determined by $$S' = \frac{F}{K\frac{\epsilon' E_m'^2}{8\pi}}$$

When the above mentioned features concerning main frame area, thickness and shaping of active parts of the movable conductive members are provided in an electrostatic machine the machine becomes able to take full advantage of the increase of the dielectric strength of the surrounding season medium.

Moreover, the investigations which led to this invention have shown that for a given resistance of the exterior circuit the useful voltage and the current capacity at a given speed are both exactly proportional to the dielectric strength of the surrounding medium when measured between parallel plates, and the useful power output in its turn becomes exactly proportional to the square of this dielectric strength.

With conventional electrostatic machines it has not heretofore been possible to develop conditions of construction and operation which will produce this result because of corona and other electrostatic effects which have limited not only the amount of power generated or produced but also the voltage for any given current including the maximum voltage which has been attainable with very small currents.

For instance, experience shows the dielectric strength of atmospheric air may be multiplied by a factor of about 15 when compressed to a pressure of 25 atmospheres. Thus, the voltage and current of any machine embodying the above mentioned improvements as to main frame area, thickness and shape of the electrodes will be multiplied by $15^2=225$ when working in air at 25 atmospheres pressure.

It is important to point out that the above described improvements become of greater and greater effect according as the dielectric strength of the fluid medium in which the machine operates is increased. Neither the current capacity nor the voltage of the conventional machines increased proportionally with the dielectric strength of the medium. For instance, the dielectric strength of air at a pressure of about 15 atmospheres is about 10 times that of atmospheric air but this secured only an increase of both current and voltage of 2 or 3 times. In some machines no substantial improvement was obtained in the current capacity due to the rapidly increasing effect of leaks and corona with pressure because a sufficiently smooth form of the electrodes was not secured. On the other hand in the improved machines of the invention the above mentioned increase of the pressure of the air would multiply both the current and voltage by the same factor, namely 10, and the power in its turn would be multiplied by 100.

Accordingly, machines responding to the invention can attain considerable electric powers exceeding 2,000 kilowatts per cubic meter of space required when operating in presently known fluid media having a high dielectric strength. Such specific power is at least 1,000 times as high as that of the best electrostatic machines hitherto manufactured and it is even higher than that of the most powerful electromagnetic machines.

The practically complete elimination of the electric losses results in the possibility of obtaining an electric efficiency of more than 98%, the electric efficiency being the fraction of the work absorbed by the electrostatic forces which is converted into useful electric energy or, in a motor, the fraction of absorbed electric energy converted into useful mechanical work. The losses are practically due only to mechanical and fluid friction but the amount of this friction may be kept low so as to obtain an overall efficiency higher than 90%.

The following are examples of application of the method according to the invention which will be described with reference to the drawings in which.

*Example I*

A machine embodying the invention in which the movable conductive members are in contact only with the fluid dielectric medium.

Figure 1:
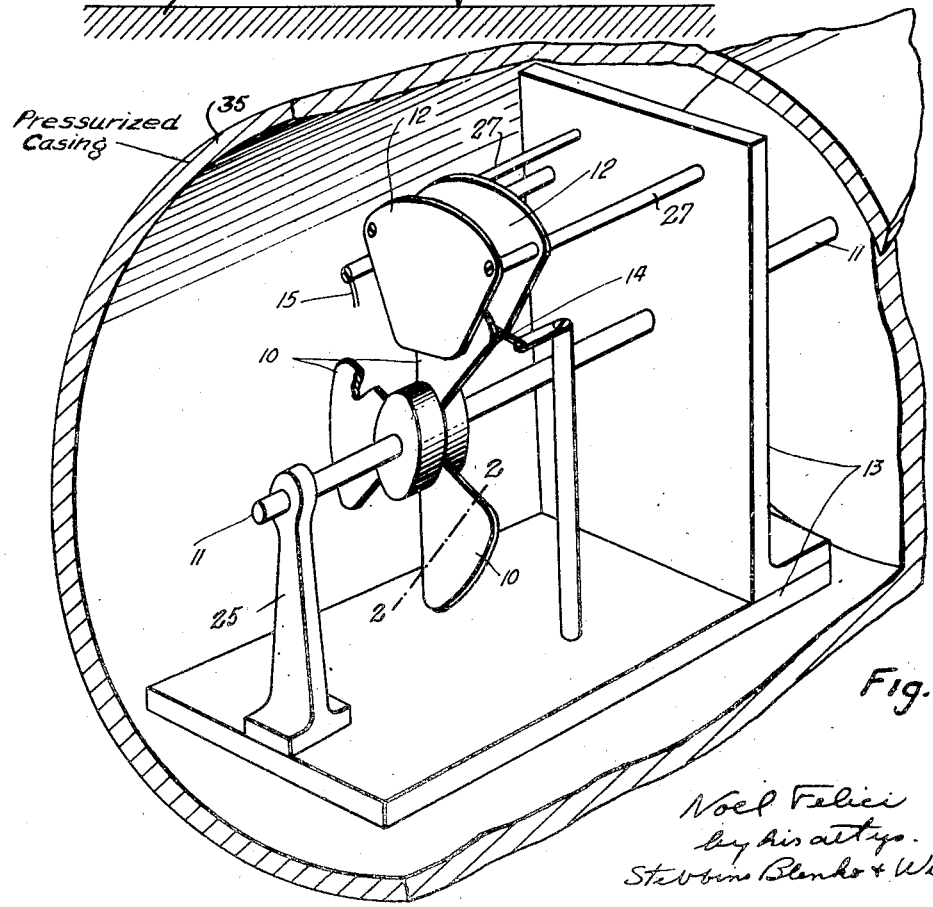
Fig. 1 is a diagrammatic perspective view showing an electrostatic machine of the Toepler type constructed in accordance with the invention.

In the embodiment diagrammatically illustrated in Fig. 1 such a machine comprises a set of three conductive sectors 10 secured on a shaft 11 in insulated relation to each other and to said shaft. The shaft 11 is supported for rotation in bearing 25 and frame 13 to effect rotative movement on the axis of the shaft of the rotor constituted by the sectors 10. Suitable driving means not shown may be used to effect rotation of shaft 11 and of this rotor. These sectors 10 which are the electricity conveyors pass during their rotation between the electricity producers formed of a pair of spaced conducting electrodes or plates 12 mounted in insulated relation to and on the frame 13 of the machine by means of studs 27. The studs 27 hold the plates 12 in position so that the conductor conveyors 10 may pass into and out of the space between and into and out of face to face relation with the producer plates 12. As shown in Fig. 1 the frame 13 may be supported by suitable means within a pressurized casing or shell 35 which may be of cylindrical form. The casing 35 may be constructed to withstand a pressure, for example, of 17 atmospheres or other suitable pressure to provide the desired dielectric strength of the air or other gaseous dielectric medium confined therein which envelopes the electrodes of the machine.

To operate the machine the conveyors 10 are set in rotation, the producers 12 having been brought to a certain potential by connection to a suitable source of electricity. When one of the conveyors 10 begins to pass between the plates 12 of the producer it is connected with the ground at the proper moment or with a source of electricity of a sign opposite to that of the producer 12 by means of a brush 14 and thus is increasingly charged with electricity as long as the capacity of the conveyor and the producer increases with increase in the lap of the face surfaces of the producer plates and the conveyor sectors. When this capacity has reached its maximum value and begins to decrease with decrease of the lap of the plates and conveyors the connection between the conveyor 10 and the brush 14 in interrupted and the potential of the conveyor rises at the rate of the decrease of the capacity provided between it and the producer plates. The conveyor then comes into contact with a terminal brush 15 insulated from the frame 13 of the machine, this brush being connected with the load. Further decrease of the capacity between conveyor and producer plates causes the electric charge of the former to flow to the load. When the discharge of the conveyor to the load is completed the connection between the conveyor 10 and the brush 15 is interrupted and the cycle may begin again.

The power of the machine may be increased by mounting a number N sets of conveyor sectors 10 in parallel side by side relation on the same shaft. The producer then should comprise $N+1$ parallel plates 12 in interspersed relation to the conveyor sectors.

The construction of the machine shown in Fig. 1 may be modified for different purposes. The conveying sectors 10 and the producer plates 12 can be substituted by members having surfaces other than plane surfaces, for instance, they may be formed as surfaces of revolution. It is also possible to make the producers movable and to cause them to rotate in the direction opposite to that of the rotation of the conveyors 10.

In the most frequently utilized arrangement, shown in the drawing, the conveyor sectors 10 and the plates 12 of the producer are arranged so as substantially to form condensers with parallel plane plates. In the following discussion $e$ represents the distance between the parallel faces of a sector and a plate of a producer and $2h$ represents the thickness of a sector.

The maximum available power of the machine is reached when the condensers formed by the stationary and movable members have stored the maximum electric energy, that is to say, when the uniform field between the parallel faces of the movable sectors 10 and of the producer plates 12 reaches $E_m$, i. e. when the potential difference between a conveyor 10 and a plate 12 reaches the value $U=E_m e$. This maximum power is $\frac{1}{4} nn'CU^2$, $n$ being the number of conveyors circumferentially spaced about the axis of the shaft 11, $n'$ the number of revolutions per second made by the conveyors, $C$ the maximum capacity produced by a conveyor and the cooperating producer plates corrected if necessary for any interfering capacities.

Figure 2:
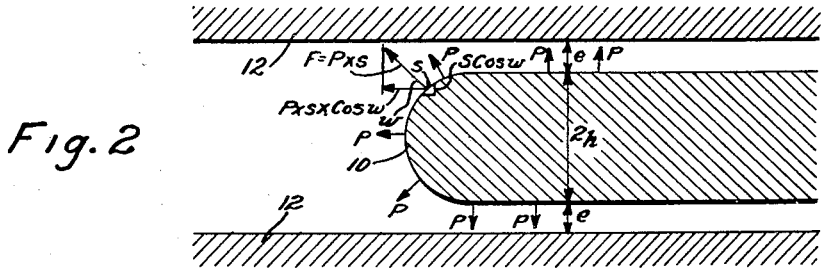
Fig. 2 is a diagrammatic sectional view to enlarged scale taken on line 2—2 of Fig. 1 of a conveying sector of such a machine movable between two producer electrodes.

The determination, according to the invention, of the characteristic features to be given to the machine in order that this maximum of power can be obtained effectively is effected in the following manner:

When a good distribution of the electrostatic field around the edge is obtained by shaping the edges of the conveyor or movable electrode there is provided a uniform pressure around the edge of the electrode. The force which is acting on an elemental surface of the edge is equal to the product of that constant pressure by the area of the elemental surface but the effective component of this force is that which is in the direction of movement of the electrode. As shown in Fig. 2, $P$ represents the uniform pressure on and normal to an elemental area of the edge surfaces and $s$ represents this area. The useful force acting in the direction of movement of the movable electrode is the component of $P \times s$ which is in this direction. This component is $P \times s \times \cos \omega$, where $\omega$ is the angle between the direction of $P$ and the direction of movement of the movable electrode. The element of work which is done when the electrode is moved through the distance $d$, therefore, is $$P \times s \times \cos \omega \times d$$

The projection of the area $s$ on a plane perpendicular to the direction of movement is $s \cos \omega$, $\omega$ being also the angle of inclination of the elemental surface to this plane of projection. The summation of the projected elemental areas is equal to the area of the cross section of the electrode one dimension of which area is the thickness $2h$ of the electrode and the other dimension is the unit length $a$ of the electrode in the direction parallel to its edge. The total work which is done for a given displacement $d$ of the movable electrode is equal to the product of the summation of the projected areas multiplied by $Pd$ and may be expressed as $$W = P \times d \times \int \cos \omega s = P \times d \times 2h \times a$$

On the other hand the work which is done by the electrostatic forces when the movable electrode is moved in face to face relation with the stationary electrode must be equal to the variation of the energy of the condenser which is formed by the movable electrode and the stationary electrode. It is known that the total energy of a plate condenser is equal to $\frac{1}{2}cU^2$ where $c$ is the capacity of the condenser and $U$ is the potential difference between its plates. The variation of the total energy of the condenser formed between the movable electrode or conveyor of the electrostatic machine and the stationary electrode or producer plate is equal to the variation of $\frac{1}{2}cU^2$. The value of $c$ in its turn varies with the variation of the amount of the overlapping surface of the movable and stationary plates as the movable plate is moved past the stationary plate and the variation of $c$ for a given amount of variation in the overlap may be expressed in C. G. S. units as $$\Delta c = \frac{\epsilon \Sigma}{4 \pi e}$$

where $\Sigma$ is the variation of the amount of the overlapping surface and $e$ is the spacing between the movable and stationary plates. The potential difference $U$ is equal to the uniform field intensity between the plates multiplied by their spacing as indicated above.

$$U = E_m e$$

Substituting the values of $\Delta c$ and $U$ in the formula $\frac{1}{2}cU^2$ for the movable conveyor electrode or plate having two active surfaces the variation in the energy for variation $\Sigma$ of the overlapping surface may be expressed as $$2 \times \frac{1}{2} \times \frac{\epsilon \Sigma}{4 \pi e} E_m^2 e^2$$

If the movement of the movable plate is $d$ and the length of the surface of the plate transverse to the movement thereof is $a$, $\Sigma$ is equal to $da$ and the expression may be rewritten as follows:

$$2 \frac{\epsilon d a E_m^2 e}{8 \pi}$$

The expression for the work of the electric force as above explained is $P \times d \times 2h \times a$ where $2h$ is the thickness of the plate, $2h \times a$ being the summation of the projected elemental areas of the curved edge surface, and $d$ the movement of the plate. Substituting $$P = \frac{\epsilon E^2}{8 \pi}$$

in this expression, $E$ being the constant value of the uniform field intensity of the edge surface, the following equation may be made $$\frac{\epsilon E^2}{8 \pi} \times d \times 2h \times a = 2 \frac{\epsilon d a E_m^2 e}{8 \pi}$$

$$\frac{E^2}{E_m^2} = \frac{2e}{2h} = \frac{e}{h}$$

If uniform distribution over the edge surfaces of the electrodes as well as over the face surfaces is to be secured $E$ will be equal to $E_m$ and the half thickness $h$ of the electrode between its faces will be equal to the spacing $e$ $$h = e$$

If the field intensity E on the edge surface is not to exceed the field intensity $E_m$ on the faces of the plate then E must be not greater than $E_m$ and $2h$ must be not less than $2e$ $$2h \geq 2e$$

It will be understood, therefore, that it is essential in order to produce large amounts of power in an electrostatic machine that the thickness of the electrodes or cooperating plates of the machine shall be many times as great as the ordinary foils of conventional machines. Since the spacing between the electrodes cannot be reduced below that which provides for proper clearances between the movable members of the machine and the stationary members thereof and particularly between the faces of the movable electrodes and the faces of the stationary electrodes, the thickness in the electrostatic machine of the invention ordinarily is not substantially less than .2 cm. and in practice may be considerably greater than this dimension depending upon the particular construction of the machine. Where the cooperating electrodes are active at only one face thereof the minimum thickness of the electrode will be not less than the spacing between the faces of the electrodes, that is, in practice it will not be substantially less than .1 cm. When electrodes are used having a thickness at least equal to the spacing between them, that is, for electrodes active at one face thereof, or a thickness equal to twice the spacing between them, that is, for electrodes active at both faces, the provision of the requisite curvature of the edge surfaces as described above to secure uniform distribution of the field intensity becomes practically possible.

When the potential difference between the sector 10 carried on the rotatable shaft 11 and a blade 12, Figs. 1 and 2, is U the energy of the condenser which they form with the capacity $c$ is $\frac{1}{2}cU^2$. During a small rotation of $d$ of the sector the capacity $c$ varies by $dc$ and the work of the electrostatic forces is $\frac{1}{2}U^2dc$.

This work is equal to that of a single force F applied at the center of gravity of the main frame of the sector and, for the small angle of rotation $d\theta$ corresponding to the movement of the sector, the work due to this force is $F \times r \times d\theta$, where $r$ is the distance from G to the axis of rotation. The equation, therefore, may be written $$\frac{1}{2}U^2 dc = Fr d\theta$$

and the value of F then may be expressed $$F = \frac{1}{2}\frac{U^2}{r}\frac{dc}{d\theta}$$

The value of $dc$ is determined from the change in the area of the overlapping surfaces of the electrodes and the spacing $e$ thereof similarly to the general exposition given above. The change in area is equal to $a \times r \times d\theta$, where $a$ is the length of the electrode transverse to the movement thereof, that is the length of the rectangle forming the main frame area of which the width is $2h$, the thickness of the electrode, the area of this rectangle being $2ha$. The change in capacity, therefore, may be expressed $$dc = \frac{\epsilon a r d\theta}{4\pi e}$$

also $$U = E_m e$$

Substituting these values in the equation for F and giving effect to the two active surfaces of the movable electrode $$F = 2 \times \frac{1}{2} \times \frac{E_m^2 e^2}{r} \times \frac{\epsilon a r d\theta}{4\pi e d\theta} = \frac{2\epsilon E_m^2 ea}{8\pi}$$

According to the invention the field intensity on the edge surface of the electrode should not exceed $E_m$ and correspondingly the electric pressure should not exceed $$\frac{\epsilon E_m^2}{8\pi}$$

The electrostatic force acting on the edge surface, therefore, should not exceed $$\frac{\epsilon E_m^2}{8\pi} \times 2ha$$

$$\frac{\epsilon E_m^2}{8\pi} \times 2ha \geq F$$

Substituting for F the value $$\frac{\epsilon E_m^2}{8\pi} \times 2ea$$

above developed $$\frac{\epsilon E_m^2}{8\pi} \times 2ha \geq \frac{\epsilon E_m^2}{8\pi} \times 2ea$$

$2h \geq 2e$, that is $h \geq e$, Fig. 2.

Figure 3:
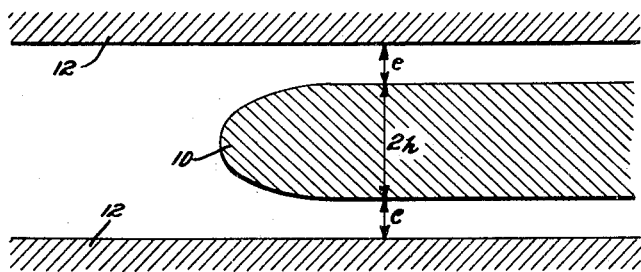
Fig. 3 is a modification of the conveyor and producer electrodes of Fig. 2.

As one example these conditions may be met by taking $h = 1.5e$ and by giving to the profile of the sector edges the shape approximating a half ellipse the ratio of the axes of which is between 2 and 3, the long axis being parallel to the plane faces of the sector, Fig. 3. In general it may be said that favorable shapes are given by the elongated curves such as an ellipse, i. e. those the curvature of which is small or zero at the point where they are tangent to the plane part of the sector, this curvature increasing up to the forwardmost or most rearward part thereof where the curvature is maximum.

The plates 12 of the producers being subjected to the same forces as the conveying sectors and having regard to the equality of the action and the reaction between the sectors and the plates, in general they may be given the same thickness and the same profile as the conveying sectors.

If the above mentioned conditions relating to the thickness of the sectors and to the shaping of their edge profiles are not satisfied the maximum power $\frac{1}{4}nn'CU^2$ can not be attained. Only a part of it can be obtained, this part being the smaller the more one departs from the prescriptions according to the invention.

A machine constructed according to the invention with a plurality of parallel sets of producers and corresponding conveyors is capable of developing large amounts of power if it operates in a fluid medium with a sufficient dielectric strength $E_m$. The capacity C can be taken equal to $$\frac{\epsilon N S_0}{4\pi e}$$

if $S_0$ is the area of one face of a plate of the machine. As the thickness of a plate is substantially $2e$, that is, is twice the spacing, the total width of a machine with N plates is substantially $6Ne$, the required volume thus being approximately $6NeS_0$. The maximum power $\frac{1}{4}nn'CU^2$ is $$\frac{1}{4}nn'\frac{\epsilon N S_0}{4\pi e}E_m^2 e^2 = \frac{1}{2}nn'(NeS_0)\frac{\epsilon E_m^2}{8\pi}$$

Dividing this expression by $6NeS_0$ which is the active volume of the machine, there is obtained the specific power, that is the power per unit of volume, viz:

$$\frac{1}{12}nn'\cdot\frac{\epsilon E_m^2}{8\pi}$$

If $\frac{\epsilon E_m^2}{8\pi} = 0.005$ Joule per cubic centimeter a value which is obtained, for instance, with Freon ($CCl_2F_2$) under a pressure of 5 atmospheres or with carbon dioxide ($CO_2$) under a pressure of 17 atmospheres, the specific power is, for $n=8$, $n'=15$ revolutions per second $$\frac{8}{12}\times 15 \times 0.005 \text{ watt/cm}^3 =$$

$$0.05 \text{ watt/cm}^3 = 50 \text{ kilowatts/m}^3$$

Example II

A machine similar to a Wimshurst machine in having two insulating plates carrying narrow conducting sectors and rotating in opposite directions but embodying features of the invention. Both plates pass between two collector combs and two diametrally opposed brushes which are grounded rub on the sectors of each of these plates.

The calculation according to the invention of the area to be given to the main frame of the sectors is effected as follows:

If $n$ is the number of the sectors for each plate, $S_0$ the flat surface of a sector and $E_m$ the dielectric strength of the fluid dielectric medium in which the machine operates, the maximum quantity of electricity which a sector may carry is:

$$Q = \frac{\epsilon E_m}{4\pi} S_0$$

In a rotation of $1/n$ of a revolution of each plate each comb receives $2Q$ or $$\frac{\epsilon E_m}{2\pi} S_0$$

Let $2V$ be the maximum potential difference between the combs consistent with the dielectric strength of the medium and consistent with good operation. For a rotation of $1/n$ revolution the maximum electric energy which may be produced is $$W = 2V \cdot 2Q = \frac{\epsilon E_m}{\pi} S_0 V$$

The maximum power of the machine is, therefore, $$n'n \frac{\epsilon E_m}{\pi} S_0 V$$

if the machine rotates at $n'$ revolutions per second.

For the usual position of the diametral brushes about ⅔ of the sectors of each plate are charged and become, therefore, the source of useful electrostatic forces. These useful forces are approximately equally distributed between all the charged sectors in proportion to ⅔ $n$. Let $F$ be the useful force acting upon a sector. Its moment with respect to the axis is $F \times R$, if $R$ is the distance from the center of a sector to the axis, and its work in the rotation of $1/n$ revolution is $$\frac{2\pi}{n} F \times R$$

The work of all the useful forces in $1/n$ revolution is $$\frac{8\pi}{3} F \times R$$

By setting this work equal to the electric energy produced in $1/n$ revolution $$\frac{8\pi}{3} F \times R = \frac{\epsilon E_m}{\pi} S_0 V$$

and the value of the useful forces $$F = \frac{3}{8\pi^2} \frac{\epsilon E_m V}{R} S_0$$

According to the invention in this example it is necessary to provide each sector with a sufficient main frame area. The minimum value of this area may be obtained by dividing the above mentioned force $F$ by the maximum electrostatic pressure $$\frac{\epsilon E_m^2}{8\pi}$$

$$\frac{8\pi F}{\epsilon E_m^2} = \frac{3}{\pi} \frac{V}{E_m R} S_0$$

or practically $$\frac{V}{E_m R} S_0$$

It is thus necessary to take the main frame area $$S \geq S_0 \frac{V}{E_m R}$$

The value $S$ given by this calculation is valid only if all the useful forces applied to the sectors are constant and equal to one another. Since in such a modified Wimshurst machine it is not possible to meet exactly these conditions it is advisable to multiply the main frame area $S$ by a coefficient of between 1.2 and 2.

By way of example if one considers a machine for which in air under ordinary pressure ($E_m = 30$ kv./cm.), $V = 60$ kv. and $R = 20$ cm., $$S \geq \frac{S_0}{10}$$

The main frame area thus determined may be obtained by using thick sectors the forward and rear edges of which shall have, for instance, a half-circular profile intended for distributing the electric field. It is also possible to use a thin metallic foil the edge portion of which is bent upon itself in a smooth closed curve so as to provide the sector with the requisite main frame area.

In a general manner the applicant has found that it is preferable to give to the movable conducting members of an electrostatic machine according to the invention a thickness of at least 0.2 centimeter or a main frame area of at least 0.2 $a$ square centimeter, $a$ being the dimension in centimeters perpendicular to the projection of the profile of the edge surface and defining therewith the main frame area. As all the edges of the conductive members must have the indicated thickness this thickness may be called the "marginal thickness" and may be defined in general as being the smallest distance which can be contained between the parallel jaws of a slide caliper or caliper-square when these jaws are both tangent to the surface of the conducting member and parallel to the direction of movement.

Example III

Figure 4:
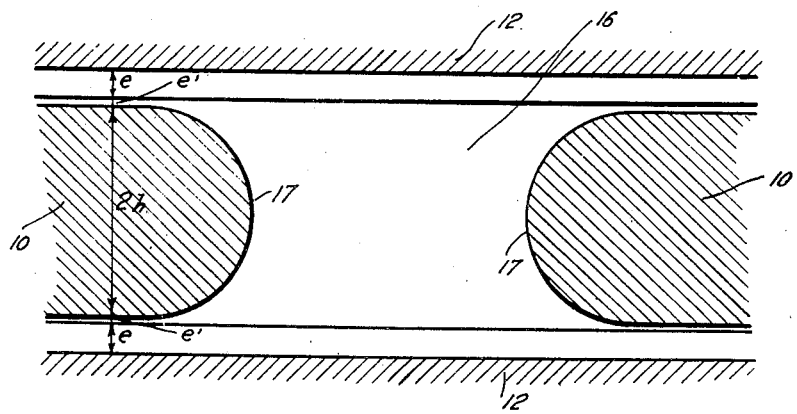
Fig. 4 is a sectional view of the electrodes in which the conductive conveyor sectors of the machine are entirely embedded in a solid insulator.

A machine in which the sectors are entirely embedded in the same mass of solid insulating composition, Fig. 4.

In this figure $e$ designates the thickness of the dielectric fluid having a dielectric constant $\epsilon$ and a dielectric strength $E_m$ existing between a conveying sector 10 and a producer plate 12 and $e'$ is the thickness of a solid insulator 16 with a dielectric constant $\epsilon'$ and a dielectric strength $E'_m$. The potential difference between producer 12 and conveyor 10 reaches its maximum value U when the field reaches the dielectric strength $E_m$ of the medium in the region where it is uniform provided the known relation $$E'_m > \frac{\epsilon}{\epsilon'} E_m$$

is met.

$$U = E_m e + \frac{\epsilon}{\epsilon'} E_m e' = \epsilon E_m \left( \frac{e}{\epsilon} + \frac{e'}{\epsilon'} \right)$$

The main frame area S of a conveyor sector 10 covered by the fluid is zero. The same is true for the main frame area S'' of the solid insulator covered by the fluid medium if, as it is usual and shown, the insulator is provided on the fluid medium side with plane faces which are parallel to the direction of movement. The only area which remains to be taken into consideration is the area S' of the main frame of a sector 10 covered by the solid insulator 16.

Similarly to the development set forth above in connection with Example I the formula for the half thickness may be developed for the construction of this example, Fig. 4. The work of the electrostatic forces during a rotation of $d\theta$ of a sector 10 is equal to that of a single force applied at the center of gravity G of the main frame of the sector and the intensity of which is $$F = \frac{1}{2} \frac{U^2 dc}{r d\theta}$$

if $r$ is the distance from G to the axis of the machine and $c$ the capacity of the condenser formed by the sector and producer. The main frame of the active parts of a sector 10 is comparable to a rectangle having the surface $S' = 2ha$, $h$ being the half-thickness and $a$ being the length perpendicular to the projection of the profile of the sector on the projection plane. Similarly to the explanation in Example I the change in capacity may be expressed $$dc = \frac{ard\theta}{4\pi \left( \frac{e}{\epsilon} + \frac{e'}{\epsilon'} \right)}$$

Substituting the value of U and the value of $dc$ in the equation for F and giving effect to the two active surfaces of the movable electrode then $$F = 2 \times \frac{1}{2} \times \frac{\epsilon^2 E_m^2 \left( \frac{e}{\epsilon} + \frac{e'}{\epsilon'} \right)^2}{r} +$$

$$\frac{ard\theta}{4\pi \left( \frac{e}{\epsilon} + \frac{e'}{\epsilon'} \right) d\theta} = \frac{\epsilon^2 E_m^2 \left( \frac{e}{\epsilon} + \frac{e'}{\epsilon'} \right) \times 2a}{8\pi}$$

The electrostatic pressure should not exceed $$\frac{\epsilon' E_m'^2}{8\pi}$$

The electrostatic force acting on the edge surface therefore should not exceed $$\frac{\epsilon' E_m'^2}{8\pi} \times 2ha$$

$$\frac{\epsilon' E_m'^2}{8\pi} \times 2ha \geq F$$

substituting for F the value $$\frac{\epsilon^2 E_m^2}{8\pi} \times \left( \frac{e}{\epsilon} + \frac{e'}{\epsilon'} \right) \times 2a$$

above developed $$\frac{\epsilon' E_m'^2}{8\pi} \times 2ha \geq \frac{\epsilon^2 E_m^2}{8\pi} \times \left( \frac{e}{\epsilon} + \frac{e'}{\epsilon'} \right) \times 2a$$

$$2h \geq 2 \times \frac{\epsilon^2 E_m^2}{\epsilon' E_m'^2} \times \left( \frac{e}{\epsilon} + \frac{e'}{\epsilon'} \right)$$

$$\geq 2 \frac{\epsilon E_m^2}{\epsilon' E_m'^2} \left( e + \frac{\epsilon}{\epsilon'} e' \right)$$

The half thickness, therefore, is expressed $$h \geq \left( e + \frac{\epsilon}{\epsilon'} e' \right) \frac{\epsilon E_m^2}{\epsilon' E_m'^2}$$

This first result being obtained it is necessary to choose for the front or back surface 17 of the sectors in Fig. 4 a favorable shape insuring a good distribution of the field, i. e. such a shape that the field remains on the entire extent of this surface less than or equal to $E'_m$, the dielectric strength of the solid insulator when it reaches the value $E_m$ in the fluid medium where the field is uniform.

By way of example substantially as shown in Fig. 4, if the solid insulator has a dielectric constant $\epsilon' = 3\epsilon$, a dielectric strength $E'_m = 0.4 E_m$ and if $e' \leq 0.2e$ the above mentioned conditions are met by taking $h = 3(e + e')$ and by giving the surface 17 a half-circular profile with the radius $h$. The shape index K' of this profile is then about 0.7.

The forces exerted between the producers 12 and the conveyors 10 being equal and opposite it is advisable to give the plates 12 of the producers a thickness which is at least equal to $$2 \left( e + \frac{\epsilon}{\epsilon'} e' \right)$$

and to choose for their edges a favorable profile insuring a good distribution of the field. These conditions will be met, for instance, by taking for the thickness of a plate $3(e + e')$ and by giving to its front and back surfaces the profile of a half ellipse the ratio of the axes of which is between 2 and 3, the long axis being parallel to the plane faces of the plate.

If the plates 12 of the producers were similarly embedded in a solid insulator so as to obtain plates similar to the movable plates it would be advisable generally to give these plates the same thickness and the same profile as the conveyor-sectors 10.

If the previously found conditions are not met it is not possible to attain with certainty the maximum power $\frac{1}{2} nn' CU^2$ the value of which has been established above. Since it is now a solid insulator which is in contact with the sectors, this insulator can be damaged by an excessive field prevailing on the active parts, which would put the machine out of use.

*Example IV*

Figure 5:
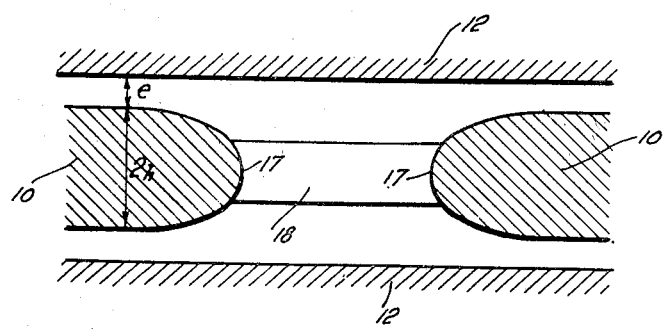
Fig. 5 is a sectional view in which a piece of solid insulator extends between and is in contact with two conductive sectors without these conductive members being entirely embedded in said insulator.

A machine in which a solid insulator occupies the space between and in contact with two consecutive sectors but does not fully embed these sectors, Fig. 5.

In this case the force F has a value $$\frac{\epsilon E_m^2}{8\pi} (2ea)$$

since the opposed faces of the conveying sectors 10 and of the producers 12 are separated only by the fluid medium but a part of the main frame of the conveyors is covered by the fluid and another part by the solid insulator 18. If $\lambda$ is the fraction of the total area of the main frame area $2ha$ covered by the solid, then $$S=(1-\lambda)\,2ha;\ S'=\lambda\,2ha\ \text{and}\ S''=0$$

because the solid insulator is limited on the fluid side by the planes parallel to the movement. The work of the electrostatic forces acting upon the active parts is less than or equal to the force $$2ha\left[(1-\lambda)\frac{\epsilon E_m^2}{8\pi}+\lambda\frac{\epsilon' E_m'^2}{8\pi}\right]$$

applied at the same point as F. This equation may be written $$2ha\left[(1-\lambda)\frac{\epsilon E_m^2}{8\pi}+\lambda\frac{\epsilon' E_m'^2}{8\pi}\right]=\frac{\epsilon E_m^2}{8\pi}(2ea)$$

i. e.

$$h\geq\frac{e}{1-\lambda+\lambda\frac{\epsilon' E_m'^2}{\epsilon E_m^2}}$$

The thickness $2h$ of the sectors 10 being calculated according to this formula it is necessary to choose for their front or back surfaces 17 a shape insuring a good distribution of the field, that is to say, such a shape that the field intensity remains in the fluid lower than or equal to $E_m$ and in the solid lower than or equal to $E'_m$, when it is equal to $E_m$ on the plane face of the sector where the field is uniform.

By way of example substantially as shown in Fig. 5, if the solid insulator 18 has a dielectric constant $\epsilon'=3\epsilon$, a dielectric strength $E'_m=0.45\,E_m$ and if $\lambda=0.5$ the preceding conditions are met by taking $h=2e$ and giving to surfaces 17 an elliptic shape with the half axes $h$ and $2h$, the long axis being parallel to the plane faces of the sector 10. The shape index K of the part of the main frame covered by the fluid is about 0.60 and the shape index K' of the portion covered by the solid is about 0.66. As to the plates 12 of the producers, if they are surrounded only by the fluid medium their case is identical with that of the above considered conveying sectors of Example I. They must, therefore, be treated according to the same rules.

Example V

Figure 6:
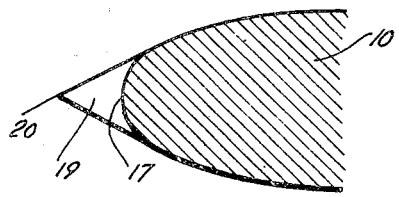
Fig. 6 is a sectional view in which a conductive sector is provided with an insulating piece in contact therewith which is not in contact with another conductive member of the machine.

A machine in which insulating pieces are secured to the rear surface of the conveying sectors, Fig. 6.

This arrangement makes it possible to give the whole of the sectors 10 and of the adapted insulating pieces 19 streamlined forms which it would not be possible to give the conductive sectors or electrodes themselves without causing electric losses.

In this case the solid insulator is provided with separate parts which are secured to the respective sectors and are materially distinct from each other, contrary to what occurs in the preceding cases. If $\lambda$ designates the fraction of the total area of the main frame $2ha$ covered with the solid insulator, the main frame areas to be considered are $$S=(1-\lambda)\,2ha;\ S'=\lambda\times2ha;\ S''=S'=\lambda\times2ha$$

The force F has always the value $$\frac{\epsilon E_m^2}{8\pi}(2ea)$$

and may be expressed approximately as follows:

$$\frac{\epsilon E_m^2}{8\pi}(2ea)=2ha\left[(1-\lambda)\frac{\epsilon E_m^2}{8\pi}+\frac{\lambda\epsilon' E_m'^2}{8\pi}+\frac{(\epsilon'-\epsilon)\epsilon}{8\pi\epsilon'}E_m^2\right]$$

$$h=\frac{e}{1-\lambda+\lambda\frac{\epsilon' E_m'^2}{\epsilon E_m^2}+\frac{(\epsilon'-\epsilon)}{\epsilon'}}$$

this value of $h$ being in the great majority of cases approached by lower value.

This first result being obtained it is necessary to choose for the surface 17 of the sectors 10 a favorable profile insuring as in the preceding cases a good distribution of the field in the solid insulator and in the fluid. By way of example, as shown substantially in Fig. 6, if the solid insulator has a dielectric constant $\epsilon'=3\epsilon$, a dielectric strength $E'_m=0.4E_m$ and if $\lambda=0.5$ the preceding conditions are met when taking $h=1.5e$ and giving to the said surface an elliptic profile of axes $h$ and $2h$, to which is adjoined an insulating tail 19 having the form of a dihedron of 60° the sharp edge 20 of which is $0.67h$ from the top of surface 17. The shape index K of the portion of the main frame of the sector covered by the fluid is about 0.8; the shape index K' of the portion of the main frame of the sector covered by the solid insulator is about 0.6 and K', shape index of the main frame of the solid insulator covered by the fluid is about 0.45. As to the plates of the producers, if they are surrounded only by the fluid medium their case is identical with that of the above considered sectors of Example I. They must, therefore, be treated according to the same rules.

Example VI

A Wimshurst or similar machine in which all the sectors of each plate are surrounded as it has been proposed by Wommelsdorf by a solid insulator with a dielectric strength $E'_m$ and a dielectric constant $\epsilon'$.

If the faces of the plates are plane and perpendicular to the axis of the rotatable discs the areas S'' are zero. The main frame area S' of a sector will be deduced from the main frame area S calculated as indicated in Example II, by the relation $$S'=S\frac{\epsilon E_m^2}{\epsilon' E_m'^2}$$

If the machine were operated in air under ordinary pressure, in which the maximum electrostatic pressure $$\frac{\epsilon E_m^2}{8\pi}$$

is small, S' might be smaller than S. The inverse, however, generally is the case in a medium such as air at high pressure having a very high dielectric strength the maximum electrostatic pressure of which exceeds that of many solid insulators.

I claim:

1. In an electrostatic machine, a conductive electrode having a substantial extent of active face surface, a second conductive electrode having a substantial extent of active face surface, at least one of said electrodes being mounted for movement relative to the other electrode to bring said active face surfaces into and out of opposed parallel spaced relation to one another, said electrodes each having a substantial thickness perpendicular to the face surface thereof and each being provided along the edges of its active face surface with edge surfaces that are profiled in a plane perpendicular to the face surface so as to form a smooth curve which merges tangentially with said face surface and is convex with respect to said electrode, the shape of the profile of said edge surface being that which provides a substantially uniform distribution of the electrostatic field about said edge surface at an intensity not substantially exceeding the intensity of the electrostatic field between the opposed face surfaces of said electrodes.

2. An electrostatic machine according to claim 1 wherein the thickness of each of the electrodes as measured by the distance between the active face surface of the electrode and the plane of the normal to the curve of the profiled edge surface that is parallel to the direction of movement is not substantially less than the spacing between the opposed active face surfaces of said electrodes.

3. An electrostatic machine comprising a conductive producer electrode having a substantial extent of active face surface, a conductive conveyor electrode having a substantial extent of active face surface in parallel relation to and disposed toward said face surface of said producer electrode, and means for supporting said electrodes for movement of one with respect to the other to move said face surfaces of said producer and conveyor electrodes parallel to and in spaced relation to each other, said electrodes each being formed to provide at the edges thereof which extend transversely of the direction of movement a profile of its edge surface in a plane perpendicular to its face surface which forms a smooth curve tangent to said face surface of said electrode and to provide a substantial thickness of the electrode perpendicular to the face surface thereof, said curve being convex with respect to said electrode and having a shape which provides a substantially uniform distribution of the electrostatic field about the edge surface not substantially exceeding in intensity the intensity of the electrostatic field between the parallel face surfaces of said electrodes.

4. An electrostatic machine comprising a stationary conductive producer electrode having a substantial extent of active face surface, a conductive conveyor electrode having a substantial extent of active face surface in parallel relation to and disposed toward said face surface of said producer electrode, and means for supporting said conveyor electrode for movement thereof with respect to said stationary electrode to move said face surface of said conveyor electrode parallel to and in spaced relation to said face surface of said producer electrode, said electrodes each being formed to provide at the edge surfaces thereof transverse to the direction of movement of said conveyor electrode a profile of its edge surfaces in a plane perpendicular to its face surface which forms a smooth curve tangent to said face surface of said electrode and is convex with respect to said electrode and provides a substantial thickness perpendicular to said face surface thereof, said curve having a curvature which is not substantially less at the intersection of said curve with the normal thereto which is parallel to the direction of movement of said conveyor electrode than the curvature at the point of tangency of said curve with said face surface of said electrode.

5. An electrostatic machine according to claim 3 in which said curve has a curvature which is greater at the intersection of said curve with the normal thereto which is parallel to said direction of movement than the curvature at the point of tangency with said face surface of said electrode.

6. In an electrostatic machine, a pair of conductive producer electrodes each having a substantial extent of active face surface at least at one face thereof, said producer electrodes being disposed with said active faces thereof toward each other and generally parallel to and in spaced relation to each other, a conductive conveyor electrode having parallel active face surfaces of substantial extent, and means for supporting said electrodes for movement of said pair of producer electrodes and said conveyor electrodes with respect to each other in the direction parallel to said faces of said producer electrodes to bring said active face surfaces of said pair of producer electrodes and said active face surfaces of said conveyor electrode into and out of parallel relation of said conveyor electrode between said producer electrodes, said electrodes being provided at the edges thereof transverse to said direction of movement with edge surfaces profiled in planes perpendicular to the respective active faces and intersecting the respective edges, each having the form of a smooth curve tangent to its respective active face surfaces intersected by said planes, the thickness of said producer electrodes being at least equal to the spacing between said producer and conveyor electrodes and the thickness of said conveyor electrode being at least twice said spacing.

7. An electrostatic machine comprising a stationary conductive producer electrode having a substantial extent of active face surface, a conductive conveyor electrode having a substantial active face surface disposed in parallel relation to and toward said face surface of said stationary producer electrode, and means for supporting said conveyor electrode for movement thereof to move said face surface of said conveyor electrode parallel to and in spaced relation to said face surface of said stationary producer electrode, said electrodes each being formed with edges transverse to the direction of movement of said conveyor electrode, each of said edges being shaped to provide a profile of its edge surface in a plane perpendicular to its face surface and extending in the direction of movement of said movable electrode which forms a smooth curve tangent to said face surface of said electrode, said curve being convex with respect to said electrode and having a shape to provide a substantially uniform distribution of the electrostatic field about the edge surface not substantially exceeding in intensity the intensity of the electrostatic field between the parallel face surfaces of said electrodes, said electrodes each having a thickness as measured by the distance between the active face surface of said electrode and the plane parallel to said face which is normal to the curve of said profile not substantially less than the spacing between said active parallel faces of said electrodes.

8. An electrostatic machine according to claim 3 wherein the thickness of each of the electrodes as measured between the active face surface of the electrode and the plane normal to the curve of the profiled edge surface that is parallel to the direction of movement is not substantially less than .1 cm.

9. An electrostatic machine according to claim 3 in which the shape of the profile of said edge surface is substantially the curve of an ellipse having the long diameter thereof parallel to said face surfaces of said electrodes.

10. An electrostatic machine comprising a conductive conveyor electrode and a conductive producer electrode each having a substantial extent of active face surface, said electrodes being supported in a dielectric medium for movement of one with respect to the other to bring said active face surfaces into and out of opposed parallel spaced relation to one another, said movement being effected in the direction parallel to said faces thereof, said dielectric medium having a dielectric strength $E_m$ and a dielectric constant $\epsilon$, said conductive electrodes being formed to provide edges extending transversely of said direction of movement having active edge surfaces capable of carrying without discharge through said dielectric medium an electrostatic pressure at any point of said surfaces approaching a maximum of $$\frac{\epsilon E_m^2}{8\pi}$$

11. An electrostatic machine as defined in claim 10 in which each of said conductive electrodes is provided along each of said edges thereof which extends transversely of the direction of relative movement of said electrode with an edge surface that is profiled in a plane perpendicular to the face surfaces of said electrodes so as to form a smooth curve convex with respect to said electrode which merges tangentially with the face surface thereof, said conductive electrodes each having a thickness for a unit length along said transverse edge of said electrode which determines a main frame area of at least $$\frac{8\pi F}{K \epsilon E_m^2}$$

F being the value of the electrostatic force acting in the direction of movement on said transverse edge of said electrode and effective at the center of gravity of said unit length o fsaid electrode to resist or to effect said movement of said electrodes, and K being a fraction designating the shape index of said profile.

12. An electrostatic machine as defined in claim 10 which comprises at least two conductive producer electrodes arranged with said active faces thereof disposed toward each other in opposed spaced relation, said conductive conveyor electrode being supported for movement between said producer electrodes and being formed with opposite faces respectively in opposed space relation to the faces of said producer electrodes, the thickness of said conveyor electrode between its faces being not substantially less than twice the spacing between a face of said conveyor electrode and the adjacent opposed face of a producer electrode.

13. An electrostatic machine comprising a conductive conveyor electrode and a conductive producer electrode each having a substantial extent of active face surface, said electrodes being supported in a fluid dielectric medium for movement of one with respect to the other to bring said active face surfaces into and out of opposed parallel spaced relation to one another, said movement being effected in the direction parallel to said faces of said electrodes, said fluid dielectric medium having a dielectric strength $E_m$ and a dielectric constant $\epsilon$, said conductive electrodes each being formed to provide edges extending transversely of said direction of movement having edge surfaces shaped with a profile in a plane perpendicular to its face surface which is a smooth curve tangent to said face surface, said curve being convex with respect to said electrode, at least said conveyor electrode carrying a solid dielectric material having a thickness $e'$ upon said face of said conveyor electrode and providing a face of said solid dielectric material parallel to said face of said conveyor electrode, the spacing between said face of said solid dielectric material and the adjacent face of said producer electrode being $e$, said solid dielectric material having a dielectric strength $E'_m$ and a dielectric constant $\epsilon'$, said conductive conveyor electrode having a thickness as measured by the distance $h$ between the active face surface thereof and the plane parallel to said face which is normal to the curve of said profile such that $$h \geq \left(e + \frac{\epsilon}{\epsilon'}e'\right)\frac{\epsilon E_m^2}{\epsilon' E'^2_m}$$

14. An electrostatic machine as defined in claim 13 in which said profile is in the form of an ellipse with the short axis thereof perpendicular to the face of said conveyor electrode at the point of tangency with said face of said conveyor electrode, $h$ being the half of the short axis of the ellipse measured from said point of tangency.

15. An electrostatic machine comprising a conductive producer electrode, at least two conductive conveyor electrodes, said producer electrodes and said conveyor electrodes each having a substantial extent of active face surface, means for supporting said conveyor electrodes in spaced relation with respect to each other with said faces thereof extending in the direction generally parallel to said face of said producer electrode and for movement of said conveyor electrodes in said direction to move said faces thereof in succession into and out of opposed parallel face to face relation to said producer electrode in spaced relation thereto, a member of solid insulating material positioned in the space between said conveyor electrodes and supported for movement therewith, said member being in contact with at least a part of the adjacent edge surfaces of said two conveyor electrodes which are transverse to said direction of movement, means for confining a fluid dielectric medium between and in contact with the face of said producer electrode and the faces of said conveyor electrodes opposed thereto, and in contact with the exposed portions of said edge surfaces of said producer electrode and of said conveyor electrodes which are transverse to said direction of movement, said conveyor electrodes each having the surfaces of said tranverse edges thereof profiled in a plane perpendicular to the face surface thereof so as to form a smooth curve which merges tangentially with said face surface and is convex with respect to said conveyor electrode, said conveyor electrodes each having a thickness as measured by the distance $h$ between the active face surface thereof and the plane of the normal to the curve of the profile of said edge surface that is parallel to the direction of movement such that $$h \geq \frac{e}{1-\lambda+\frac{\lambda \epsilon' E'^2_m}{\epsilon E_m^2}}$$

$\lambda$ being the fraction of the main frame area of the conveyor electrode covered by said solid insulating member, $e$ being the spacing between the face of said producer electrode and the face of a conveyor electrode when in said opposed face to face relation, $\epsilon$ and $\epsilon'$ respectively being the dielectric constants of said fluid dielectric medium and of the solid insulating material, and $E_m$ and $E'_m$ respectively being the dielectric strengths of said fluid dielectric medium and of said solid insulating material.

16. An electrostatic machine comprising a conductive conveyor electrode and a conductive producer electrode each having a substantial extent of active face surface, means for supporting said electrodes with said faces thereof in parallel spaced relation to each other and for movement of one with respect to the other in the direction parallel to said faces thereof to bring said electrodes into and out of face to face relation to each other, and means for confining a fluid dielectric medium having a dielectric strength $E_m$ and a dielectric constant $\epsilon'$ in contact with at least the active face of said conveyor electrode, said conveyor electrode being of substantial thickness perpendicular to the face surface thereof and carrying in contact with at least a part of the surface of the trailing edge thereof which is transverse to said direction of said movement a member of solid insulating material of hydrodynamic or aerodynamic form, said conveyor electrode having the surface of said transverse edge thereof profiled in a plane perpendicular to the face surface thereof so as to form a smooth curve which merges tangentially with said face surface and is convex with respect to said conveyor electrode, said conveyor electrode having a thickness as measured by the distance $h$ between the active face surface thereof and the plane of the normal to the curve of the profile of said trailing edge surface that is parallel to the direction of movement such that $$h = \frac{e}{1-\lambda+\frac{\lambda \epsilon' E_m'^2}{\epsilon E_m^2}+\frac{(\epsilon'-\epsilon)}{\epsilon'}}$$

$\lambda$ being the fraction of the main frame area of said conductive conveyor electrode covered by said solid insulating material, $e$ being the spacing between the face of said producer electrode and the opposed face of said conveyor electrode, $\epsilon$ and $\epsilon'$ respectively being the dielectric constants of said fluid dielectric medium and of the solid insulating material, and $E_m$ and $E'_m$ respectively being the dielectric strengths of said fluid dielectric medium and of said solid insulating material.

17. An electrostatic machine as defined in claim 1 which comprises means for confining a dielectric gaseous medium at a pressure substantially above atmospheric pressure, and means for supporting said conductive electrodes for said relative movement thereof within said confining means.

18. An electrostatic machine as defined in claim 3 which comprises means for confining a dielectric gaseous medium at a pressure substantially above atmospheric pressure between and in contact with the active face of said producer electrode and the parallel active face of said conveyor electrode and in contact with at least a part of said edge surface of said conveyor electrode.

NOËL FELICI.

REFERENCES CITED

The following references are of record in the file of this patent:

UNITED STATES PATENTS

| Number | Name | Date |
|---|---|---|
| 779,190 | Thomson | Jan. 3, 1905 |
| 2,252,668 | Trump | Aug. 12, 1941 |